March 15, 1966  A. S. McKAY ETAL  3,240,937
RADIOACTIVITY WELL LOGGING FOR DETERMINING
THE PRESENCE OF HYDROGEN
Original Filed June 15, 1959  2 Sheets-Sheet 1
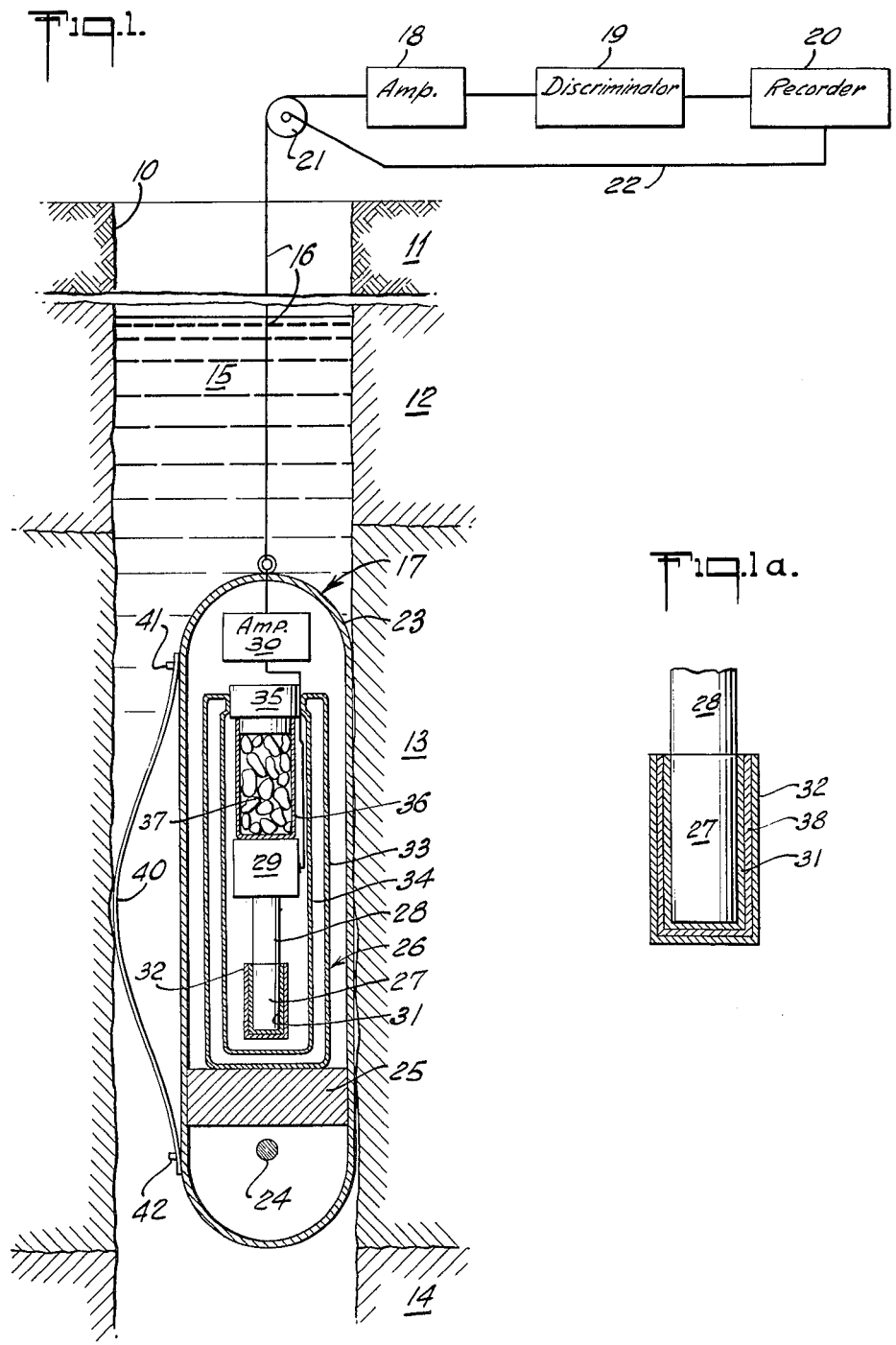

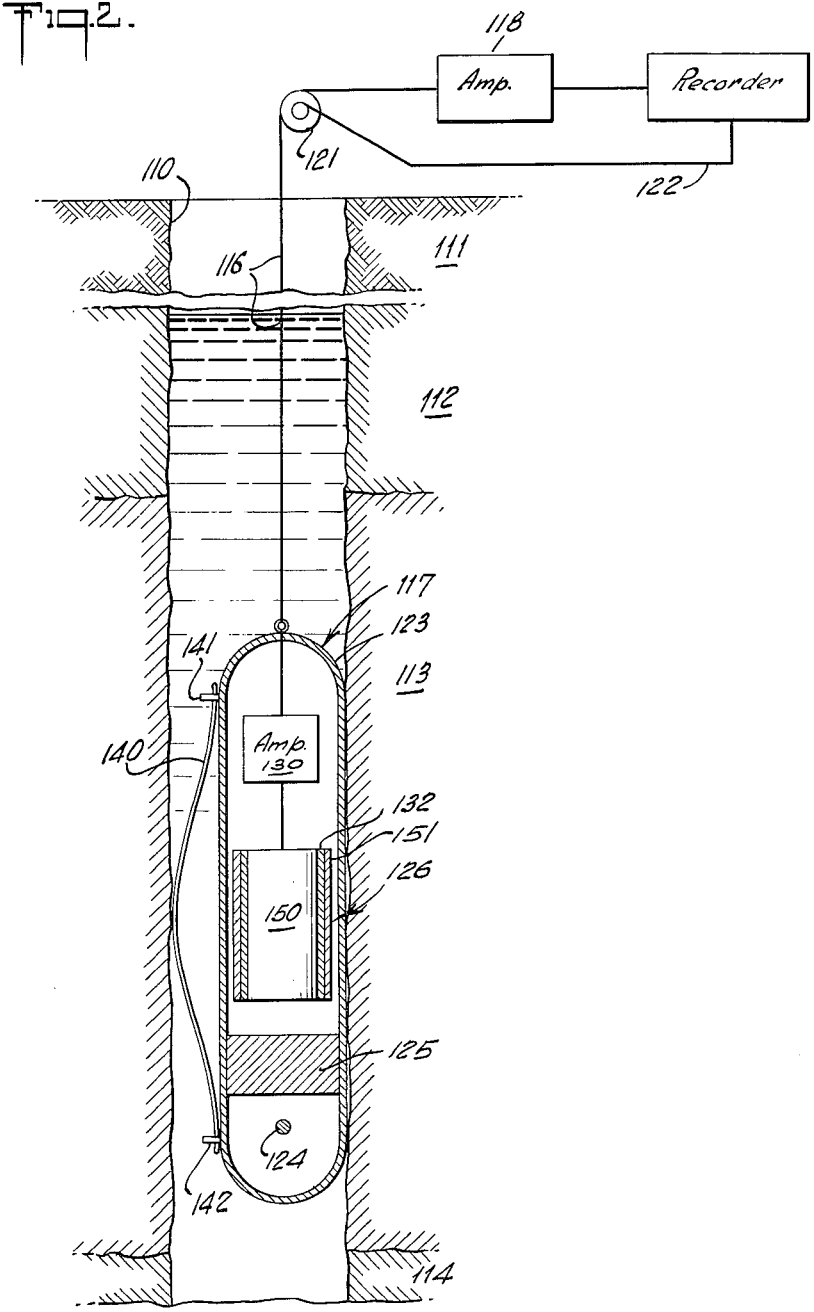

United States Patent Office 3,240,937
Patented Mar. 15, 1966

3,240,937
RADIOACTIVITY WELL LOGGING FOR DETERMINING THE PRESENCE OF HYDROGEN
Alexander S. McKay, Hopewell Junction, N.Y., and Hugh E. Hall, Jr., Houston, Tex., assignors to Texaco Inc., New York, N.Y., a corporation of Delaware
Continuation of application Ser. No. 820,240, June 15, 1959. This application June 14, 1963, Ser. No. 289,163
29 Claims. (Cl. 250—71.5)

The present invention relates generally to the determination of the nature of earth formations; and, more particularly, it is concerned with the analysis of earth formations along the traverse of a bore hole through irradiation of the formations with neutrons in order to produce certain observable effects that are detected as an indication of the nature of the formations.

This application is a continuation of application Serial No. 820,240, filed June 15, 1959, now abandoned.

The invention is especially directed toward improvements in neutron-gamma ray well logging for quantitatively determining in situ the presence of hydrogen in earth formations traversed by a bore hole. Accordingly, it is a general object of the present invention to provide improvements in radio-activity well logging wherein a source of neutrons is employed to bombard earth formations in order to cause the emission of gamma rays which are detected and whose intensity is measured as an indication of the hydrogen content of the earth formations along the well bore.

It is well known to analyze earth formations in situ along the traverse of a bore hole through the use of various radioactivity analysis techniques. It is possible to determine the presence of porous zones along the path of the bore hole through the use of such techniques which may indicate the presence or absence of hydrogen in the pores of the formation, which hydrogen may be present in hydrocarbon material as either oil or gas or as a constituent of water.

In accordance with the so-called neutron-gamma ray logs, a source of neutrons is passed through the bore hole in order to irradiate the earth formations along the traverse of the bore hole. The neutrons from the source are slowed down in the formation and bore hole fluid, primarily due to the effect of hydrogen, and after being slowed to the thermal range the neutrons are captured by material of the formation with the resultant emission of gamma rays. These neutron-gamma rays which are detected and their intensity, i.e., rate-of-occurence is measured as a measure of the hydrogen content of the formations.

When the thermalized neutrons are captured by hydrogen, gamma rays having a characteristic energy of 2.2 million electron volts are emitted by the hydrogen responsible for the capture. When only hydrogen is present in the pores of the region under investigation, the intensity, i.e., rate of occurrence of the detected gamma radiation provides a good quantitative indication of the hydrogen content of the formation. However, it has been determined that other materials which may also be present in the formation can have an adverse effect on the neutron-gamma ray well log and which may render the log unreliable as a hydrogen measurement. Of particular significance is the presence of chlorine which has a relatively high capture cross-section for thermal neutrons, as compared with that of hydrogen. In particular, chlorine has a neutron capture cross-section of about 32 Barns, whereas hydrogen has a neutron capture cross-section of about .33 Barns. Thus, chlorine is approximately 100 times more effective in capturing thermal neutrons than hydrogen. When a thermal neutron is captured by chlorine, rather than hydroigen, about 3.1 gamma rays (on the average) are emitted per capture as compared with one gamma ray per capture by a hydrogen atom. In addition to the foregoing, many of the gamma rays emitted by chlorine are of higher energy range, from about 4–8 mev., than the characteristic 2.2 mev. gamma rays of capture emitted by hydrogen. In view of the foregoing the presence of even a small amount of chlorine will ordinarily increase the intensity of the gamma radiation detected by the neurton-gamma ray instrument, thus giving a false indication of hydrogen content in the resultant log.

Accordingly, it is a more specific objective of the present invention to overcome the adverse effect of the presence of chlorine on neutron-gamma ray well logs for determining the hydrogen content of earth formations along the traverse of the well bore.

Briefly stated, one aspect of the present invention involves an improved method of neutron-gamma ray well logging wherein the adverse effect of chlorine upon the detected gamma ray signal is neutralized by subjecting the gamma ray detector to radiation, the intensity of which varies inversely with the intensity of the gamma radiation due to the pressure of chlorine, whereby the effect of chlorine is effectively neutralized.

A preferred aspect of the present invention involves the provision of an improved well logging instrument adapted to be passed through a bore hole and which comprises a source of neutrons for irradiating the formations traversed by the bore hole and a gamma ray detector for detecting radiation indicative of the presence of hydrogen in the formation, in order to provide a signal display of the intensity of the detected radiation in correlation with the position of the instrument in the bore hole, which improvement involves the provision in the vicinity of the detector of a predetermined quantity of neutron absorbing material characterized by the emission of radiation to which the said detector is sensitive. Preferably, the invention involves the provision of a gamma ray detector surrounded by a predetermined quantity of cadmium.

Advantageously, the position of the logging instrument is stabilized in the bore hole in order to avoid variations in neutron-gamma ray signal which might otherwise result. A fixed position centralized or decentralized, is important because, if the tool is not positioned, there is no way of knowing whether the changes in the response are due to hydrogen content changes of the formation or due to variations in the position.

For additional objects and advantages and for a better understanding of the invention, attention is now directed to the following description and accompanying drawings. The features of the invention which are believed to be novel are particularly pointed out in the appended claims.

In the drawings:

FIG. 1 is a schematic representation showing a vertical elevation through a portion of a bore hole having a well logging instrument suspended therein and which is constructed in accordance with the principles of the invention; and, FIG. 2 is a schematic representation similar to FIG. 1 and showing another form of logging instrument embodying principles of the invention.

Referring now to FIG. 1 of the drawings, there is shown a bore hole 10 transversing a plurality of earth formations 11, 12, 13 and 14 and containing a fluid 15 which may comprise the usual drilling fluid, water or crude oil, for example. Suspended within the bore hole 10 as by means of a cable 16, there is shown a well logging instrument 17 constructed in accordance with principles of the invention. The cable 16 may include an outer conductive sheath together with one or more additional inner conductors (not individually shown) in order to afford means for transmitting electrical signals between the instrument 17 and electrical apparatus at the surface of the earth.

The surface equipment provides a means for receiving signals transmitted from the logging instrument 16 and amplifying and otherwise translating the received signals as necessary for recording purposes. The surface apparatus includes an amplifier 18 having its input side connected to the cable 16 and having its output side connected to a pulse height analysis or discriminator 19. The output path from the discriminator 19 leads to a display device in the form of a recorder 20. It is to be understood that the recorder 20 includes rate meter circuitry as necessary for providing a record of the intensity, i.e., rate-of-occurrence of detected radiation. It is also to be understood that although the discriminator 19 is shown as part of the surface equipment, it may preferably be included as part of the equipment contained within the logging instrument 17.

In order to correlate the position of the logging instrument 17 in the bore hole 10 during a well log, there is provided at the surface a measuring apparatus 21, represented diagrammatically as a wheel having its perimeter in contact with the cable 16 for sensing movement of the cable 16 in and out of the bore hole 10. The measuring apparatus 21 may be any known device of this type suitable for determining the position of the logging instrument 17 in the bore hole 10 and advantageously may be of a type which provides an electrical output signal which may be transmitted as by means of the conductive circuit 22 to the recorder 20 for correlating the recorded logging signal with the position of the logging instrument 17 in the bore hole 10 throughout a well log.

Logging instrument 17 comprises an elongated outer shell-like housing or casing 23 formed conventionally of steel in accordance with known techniques to withstand the pressures and temperatures commonly encountered in the well logging art. Advantageously, the housing should be of such character as to withstand the conditions that may be found in a bore hole upwards of 10,000 to 20,000 feet in depth. The casing 23 contains a neutron source 24 for bombarding the earth formations along the bore hole, together with appropriate radiation detection equipment for detecting gamma rays induced in the formation as the result of irradiation by the source 24. Appropriate electrical circuitry is also enclosed within the casing 23 for amplifying and otherwise handling the output signals from the radiation detection equipment for transmission over the cable 16 to the surface equipment. In particular, the neutron source 24 is shown positioned within the housing 23 near the lower end thereof and having positioned immediately above it, a gamma ray shield 25 formed of lead or tungsten, for example, to prevent gamma radiation which may also be emitted by the source from passing to the detection equipment. Also within the housing 23 above the shield 25 and spaced a predetermined distance from the source 24, there is positioned a radition detection unit 26 which, together with its associated circuitry, is adapted and arranged to provide an output signal that is proportional to the intensity of detected gamma radiation resulting from neutrons emitted by the source. The detection unit 26 is constructed in accordance with principles of the invention so that it provides an output signal which is significantly proportional to the hydrogen content of the earth formation bombarded by neutrons from the source.

The detector unit 26 comprises a scintillation detector including a gamma ray sensitive luminophor 27, advantageously in the form of a sodium iodide crystal, together with a photomultiplier tube 28, shown mounted adjacent the luminophor 27 for detecting the output pulses from the luminophor and providing an electrical signal proportional thereto. The photomultiplier tube 28 is, in turn, shown adjacent a preamplifier 29, identified schematically and, in turn, is shown electrically connected to additional electrical equipment identified as an amplifier 30 for transmission of output signals derived from the photomultiplier tube 28 to the surface equipment by means of the cable 16. It is to be understood that the photomultiplier tube is energized by means of a high voltage source (not shown) which may comprise batteries positioned in the logging instrument 17, or, more conventionally, may involve the use of power supply equipment (not shown) including a transformer and rectifier in the logging instrument for deriving appropriate high direct current operating potential from alternating power transmitted from the surface to the logging instrument in the bore hole. It is to be further understood that the amplifier 30 may actually include any additional circuitry required for handling the transmission of the signal information to the surface in accordance with the principles well known in the art. For example, the radiation detector signals may be transmitted to the surface as amplitude modulated signals or may be transmitted in the form of frequency modulated signals in accordance with well known techniques. As is well known to those skilled in the art, filter means may also be provided for separating electrical power transmitted from the surface to the equipment in the logging instrument from the electrical signals which are transmitted from the logging instrument to the surface equipment.

The luminophor 27 is shown mounted within an aluminum container 31 which serves to protect it from moisture and physical damage. The upper end of the container 31 facing the photomultiplier tube 28 is shown as open, with the luminophor 27 in direct contact with the sensitive face of the photomultiplier tube 28. However, it is to be understood that the container 31 may be sealed with a transparent cover of glass or plastic in a manner well known in the art. Surrounding the container 31 there is provided a thin layer 32 of a neutron-absorbing material which emits a plurality of neutron-capture gamma radiations which as hereinafter discussed functions in combination with other elements of the invention to render the neutron-gamma ray signal derived by the gamma ray detector primarily sensitive to hydrogen and relatively insensitive to the effect of chlorine.

In order to stabilize and protect the scintillation logging equipment against the effect of high bore hole temperatures, and variations thereof, the luminophor and photomultiplier tube, as well as the preamplifier are all shown mounted within an insulated chamber preferably in the form of Dewar flask comprising an outer wall 33 separated from an inner wall 34 by an evacuated space. The insulated chamber is provided with an appropriate removable insulating plug 35 of cork or other insulating material. Within the Dewar flask advantageously affixed to the inside of the insulated cover plug 35, there is provided a coolant chamber 36 having thermally conductive walls, as of thin aluminum, and containing a quantity of ice 37. The coolant chamber including the ice 37 affords means for maintaining the scintillation detection equipment in a stable, relatively low temperature environment by virtue of the temperature stability afforded as the ice undergoes a change of state from the solid to the liquid phase during the logging operation. It is to be understood that other techniques for stabilizing the temperature of the instrument may be employed, for example, as shown and described in U.S. Letters Patent No. 2,824,233, granted February 18, 1958 to Gerhard Herzog.

Means are provided to stabilize the position of the logging instrument throughout a logging run, comprising a decentralizing bow spring 40, having its upper and lower ends 41 and 42 mounted to the logging instrument 17 in such manner that the spring is free to flex as the instument is moved past irregularities in the side of the bore hole. Conventionally, this may be achieved by mounting the upper and lower ends of the bow spring 40 in slidably engageable relationship to the instrument 17, as by means of elongated slots (not shown) in the bow spring 40.

In order to insure that the hydrogen detector 26 is responsive to the hydrogen only and not the natural gamma radiation or scattered gamma radiation from the neutron source, the discriminator associated therewith should advantageously be biased to exclude these undesirable lower energy gamma rays. Preferably, the discriminator should be biased so that the measured radiation signal is indicative of gamma rays having an electron energy of about 1.8 million electron volts and above as will be discussed later. This particular bias level, in combination with the 2" x 4" sodium iodide crystal and a cadmium layer for the neutron absorbing material 32 which surrounds the luminophor 27 at a source-to-detector spacing of 16 inches operates to provide a very satisfactory logging signal which is primarily responsive to the hydrogen content of the formations, due to radiation resulting from irradiation of the formation by neutrons from the source 24. By thus biasing the detector to exclude lower energy gamma rays, most of the natural gamma radiation present in the formation and any gamma radiation scattered from the source is likely to be eliminated from the detected signal, since the natural and scattered gamma radiations are both of relatively low energy level.

The neutralization of the adverse effect of chlorine upon a neutron gamma ray well log is accomplished in accordance with the present invention by subjecting the gamma ray detector to radiation which varies inversely with the effect upon the detector due to the presence of chlorine. As discussed above, chlorine has a relatively high capture cross-section and emits a plurality of gamma rays in response to the capture of each neutron. Thus, the counting rate of the gamma ray detector is increased due to the presence of chlorine. In accordance with the present invention a gamma ray signal is developed whose intensity decreases correspondingly due to the presence of chlorine. This may be accomplished by developing a gamma ray signal whose intensity is proportional to the thermal neutron flux in the vicinity of the detector. This is due to the fact that chlorine absorbs or removes thermal neutrons from the environment of the detector due to its relatively high capture cross-section. Thus, the thermal neutron flux in the vicinity of the detector is reduced due to the presence of chlorine. By introducing a neutron-absorbing material which emits a plurality of neutron capture gamma radiations in the vicinity of the detector, thermal neutrons are absorbed in said material which result in the emission of gamma radiation which is detected by the gamma ray detector. Using a sodium iodide detector, the thickness of cadmium needs to be at least enough to absorb most of the thermal neutrons and the balance is achieved by adjusting the discriminator bias. When the logging instrument passes into a region containing chlorine from an identical region with the exception that no chlorine is present, the counting rate of the gamma ray detector tends to increase due to the increase of the number of capture gamma rays directly attributable to the chlorine. However, when this occurs, the number of thermal neutrons available for capture by the neutron absorbing material around the detector is reduced thus tending to decrease the counting rate in the gamma ray detector. By suitable means, these two effects may be made to cancel one another, so that when a logging tool using this system is passed from a formation containing chlorine to one not containing chlorine but have the same porosity, formation matrix, and hydrogen content, the response remains constant.

In the apparatus shown in FIG. 1, the above-mentioned two effects may be made equal and opposite either by adjusting the bias of the discriminator, by adjustment of the amount of the neutron absorbing material 32, or by a combination. For example, the neutron absorbing material 32 may be a sheet of cadmium surrounding the crystal at such a thickness, i.e., .025" that it essentially captures all of the thermal neutrons which diffuse to the layer of cadmium. The rise in the capture gamma component may be balanced against the thermal neutron component by a discriminator setting of approximately 1.8 mev. for a source-to-detector spacing of 16". The discriminator bias will be in the range from 1 to 2.5 mev. depending upon the detector-to-source spacing, the dimension of the crystal, the case thickness, the case material, the diameter of the bore hole and the salinity of the fluid.

At the lower bias settings, there is more thermal neutron component than is necessary, and at higher bias settings there is less than is needed. Thus, in accordance with one aspect of the invention the bias may be set, for example, at 1.0 mev. and the thickness of cadmium adjusted so that the two effects cancel. If this were done, one would wish to place an additional neutron absorbing material between the crystal and the cadmium, such as boron or lithium, sufficiently thick to absorb the thermal neutrons transmitted through the cadmium. This would be desirable since neither boron nor lithium emit neutron capture gamma rays above 1.0 mev. and the crystal would not become activated. This aspect is illustrated in FIG. 1a which shows a portion of the apparatus of FIG. 1, as modified by the addition of a layer of neutron capturing material 38, such as boron, provided between the neutron interaction material 32 and the luminophor 27.

While cadmium is preferred as the material for capturing the thermal neutrons in the vicinity of the detector in order to neutralize the effect of chlorine upon the neutron gamma ray log, it is to be understood that other materials may be employed rather than cadmium and that other materials may be employed together with cadmium. In the present case, where the cadmium is employed in a logging instrument having a steel instrument casing or housing, the iron of the logging instrument coperates with the cadmium. Iron has a much lower capture cross-section for neutrons than cadmium, however, there is a relatively large quantity of iron present in the vicinity of the detector, hence, its effect is similar to that of the cadmium. Iron has a thermal neutron capture cross-section of 2.43 Barns compared with a capture cross-section of about 3500 Barns for cadmium. Iron emits neutron capture gamma rays ranging up to 9.3 mev., whereas cadmium emits gammas up to 9.05 mev. upon capture of thermal neutrons. Gadolinium may also be employed in carrying out the invention. Gadolinium has a capture cross-section of 36,300 Barns and emits neutron capture gammas up to 7.78 mev. As mentioned above, chlorine, the effect of which is to be balanced out of the resultant detected gamma ray signal, has a capture cross-section of about 32 Barns and produces neutron capture gamma rays up to about 8.56 mev.

Whether cadmium or other material having similar characteristics or a combination of such materials is employed, such as the combination of cadmium with the steel logging casing, it is important that the sum total of such material used having a predetermined net effect which results in the development of gamma ray signal in response to the thermal neutron population in the immediate vicinity of the detector which just cancels out the capture gamma effect due to the presence of chlorine in the bore hole and formation in the vicinity of the detector.

In a preferred embodiment employing a neutron source comprising 200 mc. of Ra:Be, a sodium iodide crystal radiation detector of 4" length and 2" diameter biased at 1.8 mev., and having its near side spaced from the neutron source a distance of 16", it has been found that with a steel logging casing having a thickness of 5/16", a cadmium sleeve greater than 10 mils in thickness provides a very satisfactory cancellation of the adverse effects of chlorine on the neutron-gamma ray log in formations having average ranges of porosity and salinity which are 10–30% porosity and salinities from zero to saturation.

Referring now to FIG. 2, there is shown another embodiment of the invention wherein the elements corresponding to those of the apparatus shown in FIG. 1 are identified with reference numerals having a value of 100 plus the value of the numeral applied to the corresponding element of FIG. 1. Thus, for example, the bore hole 10 and formations 11–14 of FIG. 1 correspond to the bore hole 110 and formation 111–114, respectively, of FIG. 2. Whereas the apparatus of FIG. 1 discloses a gamma ray detector of the scintillation type, the detector in apparatus of FIG. 2, involves the use of a high efficiency electrical pulse producing detector of the type disclosed in U.S. Patent No. 2,397,071 in the name of D. G. C. Hare. This type detector may, for convenience, be referred to as a high efficiency multiple plate cathode type Geiger counter and enables the construcure of a very reliable neutron gamma ray well logging instrument embodying principles of the invention and which affords certain advantages as compared with apparatus involving a scintillation type detector.

The detector 150 shown in FIG. 2 is shown surrounded by a layer of neutron absorbing material 132, discussed in detail below, and which is, in turn, surrounded by a lead shield 151 for excluding low energy scattered gamma radiation from the neutron source if a source emitting substantial gamma radiation is used. It has been found that this shield should have a gamma ray stopping power of 1/4" thick lead or equivalent for an Ra:Be neutron source. The surface equipment shown in FIG. 2 does not include a discriminator such that shown in FIG. 1. By using the high efficiency pulse type detector, together with the disclosed lead shielding and an Ra:Be neutron source, the scattered gamma radiations are eliminated without the need for the discriminator.

In the apparatus shown in FIG. 2, the detector is sensitive to gamma radiation having energies above a few kev. Therefore, in order to make this log insensitive to the chlorine content in the volume surrounding the detector, the capture gamma component of the response may be balanced against the thermal neutron component only by varying the amount of neutron absorbing material 132 in the vicinity of the detector. Various neutron aborbing materials 132 may be used as previously discussed. For example, a sheet of cadmium sufficiently thick to capture all of the thermal neutrons which get to the cadmium, placed around a 2"x4" gamma radiation detector as previously described, over compensates or, in other words, introduces a thermal neutron component in the response which is too large. The amount of cadmium may be reduced slightly, i.e., by cutting holes in it, to afford the correct degree of compensation. To afford the correct degree of compensation, approximately 25% of the thick cadmium sheet should be removed by cutting small holes uniformly spaced over the detector. Alternatively one could reduce the thickness of the cadmium sheet to approximately .004" to accomplish the same purpose.

In the case of the apparatus shown in FIG. 2, it is considered more advantageous to use a neutron source that is relatively free of gamma ray emission than in the case of the apparatus of FIG. 1. Accordingly, the neutron source of the apparatus of FIG. 2, should in the preferred embodiment comprise a relatively gamma-free source of neutrons such as actinium 227 and beryllium or a comparable gamma-free source. In the case of the apparatus of FIG. 1, a radium-beryllium, neutron source may be employed together with the biasing discussed above, which is effective to exclude the source-emitted gamma rays from the detected gamma ray signal.

In accordance with a further aspect of the herein disclosed invention, it is contemplated that the neutron interaction material in the vicinity of the neutron-gamma ray detector may be placed around the outside of the casing of the logging instrument in the vicinity of the detector, rather than inside the casing as shown in the drawings. For example, this aspect may advantageously be carried out by plating the outside of the logging instrument in the vicinity of the neutron-gamma ray detector with a predetermined quantity of cadmium in order to provide for effective neutralization of the effect of chlorine upon the neutron-gamma ray log, as discussed in detail hereinabove.

The subject matter of this application is closely related to certain subject matter disclosed and claimed in applicants' copending applications Serial Nos. 820,236, 820,237, now U.S. Patent No. 3,151,242, 820,239, now U.S. Patent No. 3,147,378 and 820,241.

Obviously many modifications and variations of the invention, as hereinbefore set forth, may be made without departing from the spirit and scope thereof, and therefore, only such limitations should be imposed as are indicated in the appended claims.

We claim:

1. In the method of neutron-gamma ray well logging involving passing a source of neutrons through a bore hole to irradiate the formations traversed by the bore hole and detecting neutron induced gamma rays emitted from the formation as a result of said irradiation and providing a signal display proportional to the intensity of the detected gamma radiation in correlation with the position of the detector in the bore hole, the improvement wherein the effect of chlorine on the neutron gamma ray log is substantially neutralized by simultaneously detecting along with said neutron-induced gamma rays a predetermined quantity of a radiation component whose intensity varies inversely with the variations in the neutron-gamma ray signal as affected by chlorine.

2. In the method of neutron-gamma ray well logging involving passing a source of neutrons through a bore hole to irradiate the formations traversed by the bore hole and detecting neutron-induced gamma rays resulting from said irradiation and providing a signal display proportional to the intensity of the detected gamma radiation in correlation with the postion of the detector in the bore hole as a measure of a characteristic of the irradiated formations, the improvement wherein the effect of chlorine on the neutron gamma ray log is substantially neutralized by simultaneously producing a predetermined quantity of a radiation component whose intensity varies inversely with variations in the neutron gamma ray signal as affected by chlorine and detecting said component simultaneously with the neutron-induced gamma rays.

3. In apparatus for conducting a neutron gamma ray well log of a bore hole comprising a logging instrument adapted to be passed through a bore hole and comprising a source of neutrons and a detector of gamma rays which may result from irradiation of an earth formation by neutrons from the source, the improvement comprising a predetermined quantity of neutron aborbing material positioned in the vicinity of the detector and characterized by the emission of radiation to which the detector is sensitive, said detector being substantially unshielded with respect to said radiation emitted from said neutron absorbing material such that said detector is exposed to at least a major portion of said radiation emitted from said neutron aborbing material and travelling toward said detector, the quantity of said aborbing material being chosen in relation to the intensity and spacing from said source such that radiations will be emitted therefrom in response to interaction with neutrons having an intensity which substantially neutralizes the effect of chlorine on the neutron gamma ray log.

4. In apparatus for conducting a neutron gamma ray well log of a bore hole comprising a logging instrument adapted to be passed through a bore hole and comprising a steel housing containing a source of neutrons and a detector of gamma rays which may result from irradiation of an earth formation by neutrons from the source, the improvement comprising a thin sleeve surrounding at least a portion of the active volume of the detector and formed of a predetermined quantity of neutron absorbing material characterized by the emission of radiation to which the detector is sensitive, said detector being substantially unshielded with respect to said radiation emitted from said neutron absorbing material such that said detector is exposed to at least a major portion of said radiation emitted from said neutron absorbing material and travelling toward said detector, the quantity of said absorbing material being chosen in relation to the intensity and spacing from said source such that radiation will be emitted therefrom in response to interaction with neutrons having an intensity which substantially neutralizes the effect of chlorine on the neutron gamma ray log.

5. Apparatus as defined in claim 3 wherein the neutron absorbing material is cadmium.

6. Apparatus as defined in claim 4 wherein the sleeve of neutron-absorbing material is formed of cadmium.

7. In apparatus for conducting a neutron gamma ray well log of a bore hole comprising a logging instrument adapted to be passed through a bore hole and comprising a source of neutrons and a detector of gamma rays which may result from irradiation of an earth formation by neutrons from the source, the improvement comprising a scintillation type gamma ray detector having a predetermined quantity of neutron-absorbing material positioned in the vicinity of the detector and characterized by the emission of radiation to which the detector is sensitive, said detector being substantially unshielded with respect to said radiation emitted from said neutron absorbing material such that said detector is exposed to at least a major portion of said radiation emitted from said neutron absorbing material and travelling toward said detector, the quantity of said absorbing material being chosen in relation to the intensity and spacing from said source such that radiation will be emitted therefrom in response to interaction with neutrons having an intensity which substantially neutralizes the effect of chlorine on the neutron gamma ray log, said scintillation type detector having a pulse amplitude discriminator associated therewith which is biased to exclude at least those lower energy gamma rays which may be scattered to the detector from the source.

8. In apparatus for conducting a neutron gamma ray well log of a bore hole comprising a logging instrument adapted to be passed through a bore hole and comprising a source of neutrons and a detector of gamma rays which may result from irradiation of an earth formation by neutrons from the source, the improvement comprising an electrical pulse producing gamma ray detector having operatively associated therewith a predetermined quantity of neutron-absorbing material characterized by the emission of radiation to which the detector is sensitive, said detector being substantially unshielded with respect to said radiation emitted from said neutron absorbing material such that said detector is exposed to at least a major portion of said radiation emitted from said neutron absorbing material and travelling toward said detector, the quantity of said absorbing material being chosen in relation to the intensity and spacing from said source such that radiation will be emitted therefrom in response to interaction with neutrons having an intensity which substantially neutralizes the effect of chlorine on the neutron gamma ray log, said detector having a surrounding gamma ray shield to exclude lower energy gamma rays which may be scattered to the detector from the source.

9. In apparatus for conducting a neutron gamma ray well log of a bore hole to determine the hydrogen content of the formations along the traverse of the bore hole comprising a logging instrument adapted to be passed through a bore hole and comprising a source of neutrons and a detector of gamma rays which may result from irradiation of an earth formation by neutrons from the source, the improvement comprising a scintillation type gamma ray detector having a predetermined quantity of neutron-absorbing material positioned in the vicinity of the detector and characterized by the emission of radiation to which the detector is sensitive, said detector being substantially unshielded with respect to said radiation emitted from said neutron absorbing material such that said detector is exposed to at least a major portion of said radiation emitted from said neutron absorbing material and travelling toward said detector, the quantity of said absorbing material being sufficiently large to capture essentially all thermal neutrons which diffuse thereto as the result of said source, said material being characterized by the emission of radiation in response to interaction with neutrons having an intensity which tends to neutralize the effect of chlorine on the neutron gamma ray log, said scintillation type detector having a pulse amplitude discriminator associated therewith which is biased to exclude those lower energy gamma rays having an electron energy below a predetermined value such that the intensity of the radiation emitted by said substance substantially neutralizes the effect of chlorine on the neutron gamma ray hydrogen content log.

10. Apparatus according to claim 9 wherein said predetermined bias value is in the range of 1.0 million electron volts to 2.5 million electron volts.

11. In apparatus for conducting a neutron gamma ray well log of a bore hole comprising a logging instrument adapted to be passed through a bore hole for conducting a log of the hydrogen content of the formations traversed by the bore hole and comprising a source of neutrons and a detector of gamma rays which may result from irradiation of an earth formation by neutrons from the source, the improvement comprising a scintillation type gamma ray detector including a luminophor having a predetermined quantity of a first type of neutron-absorbing material positioned in the vicinity thereof, said first type of material being characterized by the emission in response to neutron absorption of radiation to which the luminophor is sensitive, said detector being substantially unshielded with respect to said radiation emitted from said neutron absorbing material such that said detector is exposed to at least a major portion of said radiation emitted from said neutron absorbing material and travelling toward said detector, said scintillation type detector having a pulse amplitude discriminator associated therewith which is biased to exclude gamma rays below a predetermined lower energy value of the order of one million electron volts, the quantity of said first type of absorbing material being chosen in correlation with said bias value such that radiation reaching said luminophor therefrom in response to interaction with neutrons is of an intensity which substantially neutralizes the effect of chlorine on the neutron gamma ray log, and a layer of a second type of neutron absorbing material substantially surrounding said luminophor, said second type of material being sufficiently thick to intercept substantially all thermal neutrons which may diffuse thereto as the result of said source and which are not intercepted by said first type of material, said second type of material being substantially permeable to gamma radiation and having a substantially zero emission characteristic for neutron-gamma rays having energies above said gamma ray bias value.

12. Apparatus according to claim 11 wherein said first type of material includes at least one element from the group consisting of cadmium and gadolinium.

13. Apparatus according to claim 11 wherein said second type of material is selected from the class of materials consisting of boron and lithium.

14. Apparatus according to claim 12 wherein said second type of material is selected from the class of materials consisting of boron and lithium.

15. In the method of neutron-gamma ray well logging involving passing a source of neutrons through a bore hole to irradiate the formations traversed by the bore hole and detecting neutron-induced gamma rays resulting from said irradiation and providing a signal display proportional to the intensity of the detected gamma radiation in correlation with the position of the detector in the bore hole as a quantitative indication of the hydrogen content of the irradiated formations, the improvement wherein the effect of chlorine on the neutron-gamma ray log as a measure of the hydrogen content is substantially neutralized in the signal display which comprises the steps of intercepting a predetermined percentage of the thermal neutrons in the vicinity of the detector and producing a corresponding gamma ray flux which varies according to the intercepted thermal neutron flux and detecting said corresponding gamma ray flux along with the neutron-gamma rays emitted from the formation as the result of said source.

16. The method of claim 15 which involves the use of a scintillation type gamma ray detector having associated therewith a pulse amplitude discriminator suitable to exclude gamma rays below a predetermned energy level and which involves the additional step of adjusting the bias of said discriminator until the effect of chlorine upon the neutron-induced gamma ray hydrogen content signal is substantially neutralized by the gamma rays produced as a result of intercepting thermal neutrons in the vicinity of the detector.

17. The method of neutron-gamma ray well logging according to claim 1 wherein the neutron gamma rays detected are those primarily indicative of the presence of hydrogenous material whereby the signal display proportional to the intensity of the detected gamma radiation provides an indication of the hydrogen content of the earth formations along the well bore.

18. Apparatus as defined in claim 3 wherein the spacing between said source and said detector is chosen to provide a logging signal which is primarily responsive to the hydrogen content of the formations logged.

19. Apparatus as defined in claim 18 wherein said spacing between the source and detector is of the order of 16 inches.

20. In the method of radioactivity well logging involving passing a source of neutrons through a bore hole to irradiate the formations traversed by the bore hole and detecting first radiations occurring in the bore hole as a result of said irradiation and providing a signal display porportional to the intensity of said detected radiation in correlation with the position of the detector in the bore hole as an indication of a characteristic of the formation, the improvement wherein the effect of chlorine on the radiation log is substantially neutralized by simultaneously detecting along with said first radiation a predetermined quantity of a second radiation whose intensity varies inversely with the variations in the intensity of said first radiation due to the effect of the chlorine in the environment of said radiation.

21. The method of claim 20 wherein the intensity of said first radiation varies as a function of both the hydrogen content and chlorine content of its environment.

22. The method of claim 21 wherein the intensity of said second radiation also varies as a function of the hydrogen content of the environment and wherein said variations in the intensity of said second radiation due to hydrogen are inverse to said variations in the intensity of said second radiation due to the effect of chlorine.

23. The method of claim 22 wherein said first radiation comprises essentially neutron-induced gamma radiation and said second radiation comprises essentially neutron radiation.

24. In a system for conducting a radioactivity well log comprising a logging instrument adapted to be passed through a bore hole traversing a plurality of earth formations, said instrument including means comprising a source of neutrons for irradiating earth formations along the traverse of the bore hole, radiation detecting means quantitatively sensitive to the intensity of radiations occurring in the bore hole as a result of the irradiation of the earth formations by neutrons from said source, said detecting means comprising means for selectively detecting the combination of a first radiation component resulting from said irradiation which varies in intensity as a function of said given characteristic and which also varies due to the presence of chlorine together with a predetermined quantity of a second radiation component resulting from said irradiation which varies in intensity inversely with the variations of said first radiation component due to the presence of chlorine, said detecting means further comprising an output means for providing a common output signal which varies as a function of the combination of said first and second radiation components, and means operatively coupled to the output of said detecting means for utilizing said signal which varies as a function of the combination of said first and second radiation components detected thereby and which varies primarily as a function of said given characteristic to the substantial exclusion of the influence of chlorine which may also be present.

25. Apparatus as defined in claim 24 wherein said means for selectively detecting the combination of a first radiation component together with a predetermined quantity of a second radiation component comprises means for selectively detecting a first radiation component consisting essentially of neutron-induced gamma radiation together with a predetermined quantity of a second radiation component consisting essentially of thermal neutron radiation.

26. Apparatus as defined in claim 24 wherein said given characteristic is the hydrogen content of the irradiated formations.

27. Apparatus as defined in claim 25 wherein said given characteristic is the hydrogen content of the irradiated formations.

28. Apparatus as defined in claim 25 wherein said detecting means includes a scintillation type gamma radiation detector having associated therewith a pulse amplitude discriminator suitable to exclude gamma radiation below a predetermined energy level and which further includes means for rendering said radiation detector sensitive to thermal neutron radiation and wherein means are provided for adjusting the bias of said discriminator.

29. Apparatus as defined in claim 24 wherein said means for selectively detecting the combination of a first radiation component together with a predetermined quantity of a second radiation component comprises means for selectively detecting a first radiation component which varies in intensity as a function of the hydrogen content of the irradiated formations and which also varies due to the presence of chlorine together with a predetermined quantity of a second radiation component resulting from said irradiation which varies in intensity inversely with the variations of said first radiation component due to the presence of chlorine and wherein said second radiation component also varies as a function of the hydrogen content of the irradiated formations and wherein said variations in the intensity of said second radiation due to hydrogen are inverse to said variations in the intensity of said second radiation due to the effect of chlorine.

References Cited by the Examiner
UNITED STATES PATENTS

| Re. 24,383 | 10/1957 | McKay | 250—71.5 |
| 2,933,609 | 4/1960 | Norelius | 250—83.6 |
| 3,090,867 | 5/1963 | Swanson et al. | 250—83.6 |

RALPH G. NILSON, *Primary Examiner.*

ARCHIE R. BORCHELT, *Examiner.*